United States Patent [19]

Menendez

[11] 4,456,230
[45] Jun. 26, 1984

[54] APPARATUS FOR THE SEPARATION OF METALLIC ZINC FROM RESIDUES CONTAINING ZINC

[76] Inventor: Juan Blas S. Menendez, C/de Poniente No. 3-Urbanizacion Monte Alina, Pozuelo De Alarcon (Madrid-23), Spain

[21] Appl. No.: 438,744

[22] Filed: Nov. 3, 1982

[30] Foreign Application Priority Data

Nov. 13, 1981 [ES] Spain ................................ 507.133

[51] Int. Cl.³ .............................................. F27B 14/02
[52] U.S. Cl. .................................... 266/143; 266/158; 266/165; 266/227; 266/235; 266/241; 266/226; 75/86
[58] Field of Search ............... 266/232, 235, 241, 143, 266/158, 165, 226, 227; 75/24, 86

[56] References Cited

U.S. PATENT DOCUMENTS

| | | | |
|---|---|---|---|
| 3,843,106 | 10/1974 | Nanjyo et al. | 266/241 |
| 3,902,894 | 9/1975 | Menendez | 75/86 |
| 4,003,559 | 1/1977 | Kuwano et al. | 266/207 |
| 4,121,810 | 10/1978 | Lui et al. | 266/235 |

Primary Examiner—M. J. Andrews
Attorney, Agent, or Firm—McGlew and Tuttle

[57] ABSTRACT

An apparatus for separating metallic zinc from zinc-containing residues includes a tank which is coolable by the flow of air through a helicoidal conduit that is open radically to the outside via upper and lower orifices and formed within a chamber surrounding the tanks internal refractory coating. A radial flow of molten material against the tank walls is produced by the driven blades of a paddle wheel. Air is supplied to the tank via an air intake in the closure cover. An upper annulr chamber around the cover's seating communicates with the tank's interior via the cover and has an external orifice for connection of a suction conduit.

7 Claims, 9 Drawing Figures

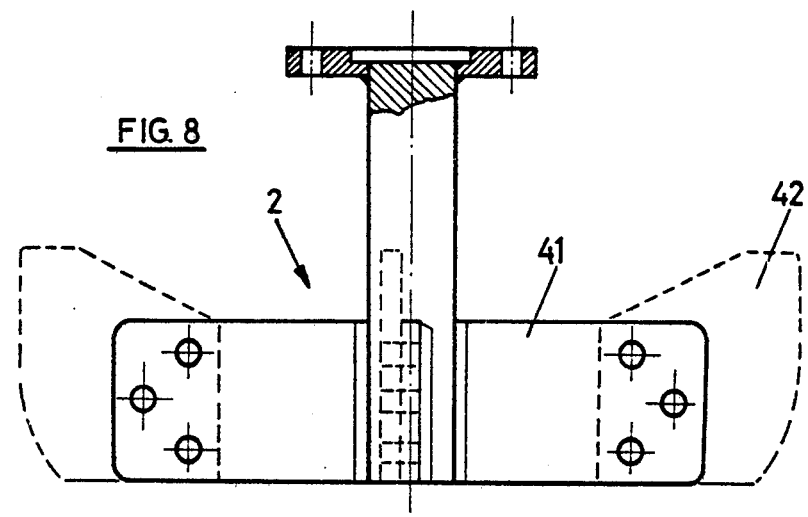
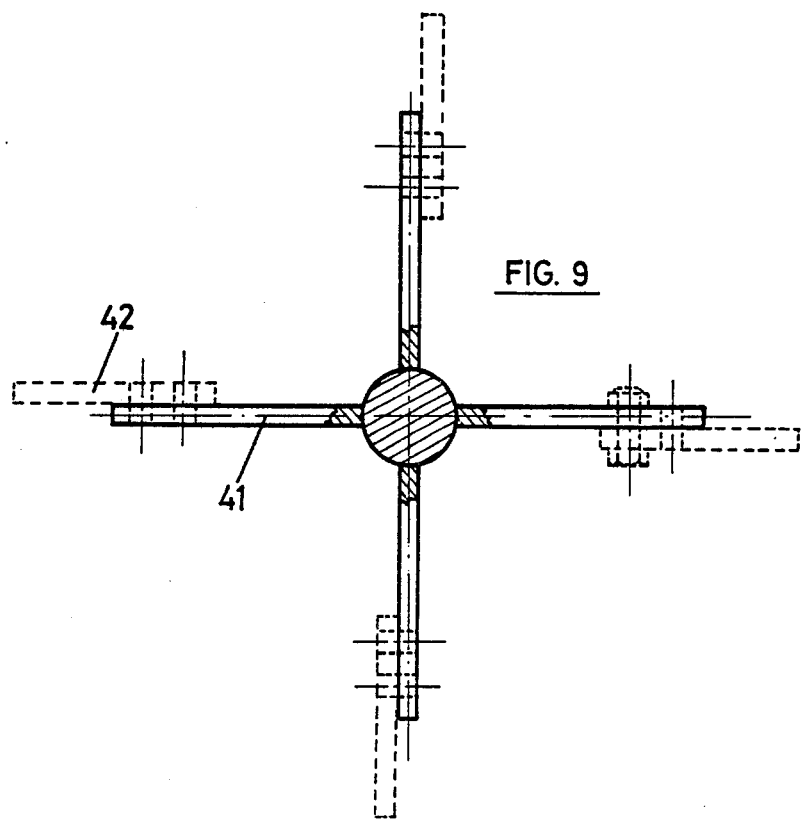

APPARATUS FOR THE SEPARATION OF METALLIC ZINC FROM RESIDUES CONTAINING ZINC

FIELD AND BACKGROUND OF THE INVENTION

The present invention relates to a reactor for the recovery of zinc contained in scrap, residues and mattes of that metal.

Due to the high level of demand for zinc, in particular for use as a means for protecting iron and steel by forming a covering thereron by galvanization, recovery of the zinc contained in scrap, residues and in particular galvanization mattes is becoming more important.

During the galvanization process, zinc-iron intermetallic components with occluded zinc are formed, due to the chemical reactions between the iron to be galvanized and the zinc bath, and direct attack of the bath on the galvanization tanks or containers. This includes the action of iron salts which are formed by virtue of the molten materials attacking the components to be galvanized. This produces a sediment at the bottom of the galvanization tanks or the components remain floating on the molten zinc, depending on the density thereof. The iron content of those compounds may be between 3 and 4% and even more.

Such compounds are commonly referred to as "mattes" or more correctly "bottom mattes" and "surface mattes" and form one of the more interesting residues, from the point of view of recovery of secondary zinc.

The process for recovering zinc from the above-mentioned mattes or residues is based on separation of the iron contained in the crystals of $FeZn_{13}$ forming the matte, by means of the addition of aluminum to form an aluminum-iron intermetallic compound. That compound undergoes surface oxidation to be converted into a black powder which is not wetted by the molten zinc, thereby minimizing the losses in the separation operation.

The intermetallic compound formed is of a density which is lower than that of the molten zinc, whereby when the mixture is left at rest, it will float on the surface thereof. However, due to the viscosity of the liquid and the small size of the crystals, that operation will be found to be very slow.

In order to speed up the separation operation, it is known for the molten mass to be subjected to agitation in a reaction vessel which comprises a tank or vat for containing the mattes, scrap or residues in a molten state, with a paddle wheel disposed in the tank or vat and mounted on a vertical shaft. The shaft of the rotor member is supported by an upper head portion which is displaceable in a vertical direction. The upper portion also carries the motor for driving the shaft, and a cover for closing the tank or vat. In turn, the upper portion is supported by a horizontally displaceable carriage while the tank or vat is mounted on two external pivots which define an axis of rotation normal to the axis of the tank or vat, and permit it to be lowered.

In the reaction vessels of the above-indicated kind, the blades of the bladed rotor wheel are at a given angle for them to drive the molten mass towards the bottom of the tank or vat, thereby impinging against the bottom of the tank or vat and the reaction vessel walls. That arrangement of the blades of the bladed wheel produces, within the vat or tank, a flow of molten material in a closed circuit in a vertical direction, moving downwardly at the center of the material and upwardly at the periphery, with the flow being cut or interrupted by the blades of the agitator.

On the other hand, due to the configuration of the vat or tank, it is virtually impossible to achieve adequate control of the temperature of the molten material.

The above-described apparatus does not achieve the desired efficiency, essentially because of the characteristics of the flow of molten material which is generated within the tank, the impossibility of controlling the temperature within the tank or vat and the absence of control in respect to the air required for causing oxidation of the intermetallic compound.

The type of flow generated in the tank or vat and the lack of control in regard to the temperature of the material result in the formation of an intermetallic compound having the formula $Al_3Fe$, with a high melting point. That, combined with the lack of control in regard to the oxidation air, means that surface oxidation of the intermetallic compound and separation thereof from the molten material requires long apparatus operating times, including the necessity of stopping and starting the process a number of times.

SUMMARY OF THE INVENTION

The object of the present invention is to provide a reaction vessel of the specified type, wherein the rotor can be displaced and the blades of the rotor wheel are so disposed that the separation process can be effected in a quick and sound manner.

Another object of the present invention is to provide a reaction installation in which the wall of the tank or vat is formed in such a way as to permit cooling thereof thereby permitting the temperature of the molten material to be controlled. The reaction which occurs within the tank or vat is exothermic, whence the necessity to dissipate the heat produced, since if that were not done, the temperature would rise to limits which would make it necessary to interrupt the process, since the reaction only takes place within certain temperature limits.

A further object of the present invention is to provide a reaction installation with simple means for ensuring that the amount of air required for maintaining an oxidizing atmosphere is blown into the tank or vat, that amount of air being suitable to cause surface oxidation of the crystals of the intermetallic compound.

The specific arrangement of the blade on the rotor in the apparatus according to the invention and the possibility of controlling the temperature of the molten material in the tank or vat gives rise to the formation of an intermetallic compound, of formula AlFe, having a melting point which is lower than that of $Al_3Fe$. The nature of that intermetallic compound, combined with the possibility of supplying the amount of air required for oxidation thereof, permit the separation process to be carried out more easily and rapidly than with the known reaction installations. In addition, reducing the temperature of the molten mass results in the tank or vat and the rotor wheel having an increased service life.

In accordance with the present invention, in order to provide for adequate cooling of the tank or vat, the tank or vat is provided, at its side wall, with a peripheral chamber which surrounds the internal refractory coating thereof. A helicoidal transverse partitioning wall forming a helicoidal conduit which communicates radially with the exterior by way of an upper orifice and a lower orifice which are disposed in the outside wall of the chamber, extends through the interior of the chamber for the flow of cooling air.

In addition, and also in accordance with the present invention, to ensure the intake of air into the tank or vat in the amount required for producing an oxidizing atmosphere, the cover of the vat or tank has an air intake opening. Mounted on the tank or vat is an upper annular chamber which is disposed around the seating of the cover. The annular chamber communicates with the interior of the tank or vat by way of the actual cover and has an outside orifice which is connected by means of a rotary connection or a connection of the ball and socket joint type, to a suction intake conduit which opens at a bag filter or the like. The filter is provided for recovering the oxide produced and also for producing suitable control in respect to contamination caused during the agitation operation, as well as in the phases of extraction of the agitator, pouring of the refined metal and extraction of the residues which occur in the form of oxides in the vat or tank at the end of each operation.

In accordance with another aspect of the invention, the blades of the rotor are co-planar with the axis of the vat or tank so that they generate, in the molten material, a flow in a radial direction, which impinges against the wall of the vat or tank.

The above-mentioned upper annular chamber is interrupted in the region corresponding to the pouring channel of the vat or tank.

The inside wall of the annular chamber is of a circular configuration, with a continuous intermediate peripheral groove while the outside wall has a spiral-shaped form which starts from one of the sides of the pouring channel and has an aperture close to the other side of the channel. For its part, the cover of the vat or tank has a peripheral annular chamber which is open downwardly by way of apertures disposed within the region thereof on the tank or vat and radially by way of apertures provided in the outside wall of the annular chamber. The apertures in the outside wall are disposed opposite to the continuous peripheral aperture of the inside wall of the upper annular chamber, thus providing an intercommunication between the annular chamber and the interior of the tank or vat by way of the cover, when the agitator is still within the tank or vat.

As indicated above, the tank or vat of the reaction installation is mounted on two external upper supports which define an axis of rotation that is normal to the axis of the tank or vat, and permit it to be lowered. One of those supports comprises a hollow shaft bearing member to which there is connected, at one side, an air impulsion conduit while on the other side there is connected a conduit which goes to the upper orifice of the helicoidal conduit formed by the peripheral chamber for cooling the wall of the tank or vat.

In this way, the tank or vat is effectively cooled, by means of a simple installation.

In order to avoid premature deterioration of the rotor-carrying shaft and to protect the rolling bearing members from the high temperatures transmitted to the shaft by the molten material, the shaft is of a tubular configuration, and extending within the interior thereof is a conduit which extends to the vicinity of the rotor and which, with the wall of the shaft, defines an annular chamber, the conduit and annular chamber opening at their upper part for connection thereof to a cooling fluid supply circuit, by way of a rotary connection.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIGS. 8 and 9 are a side view and a plan view respectively of the rotor both partly in section.

DESCRIPTION OF THE PREFERRED EMBODIMENT

Figure 1:
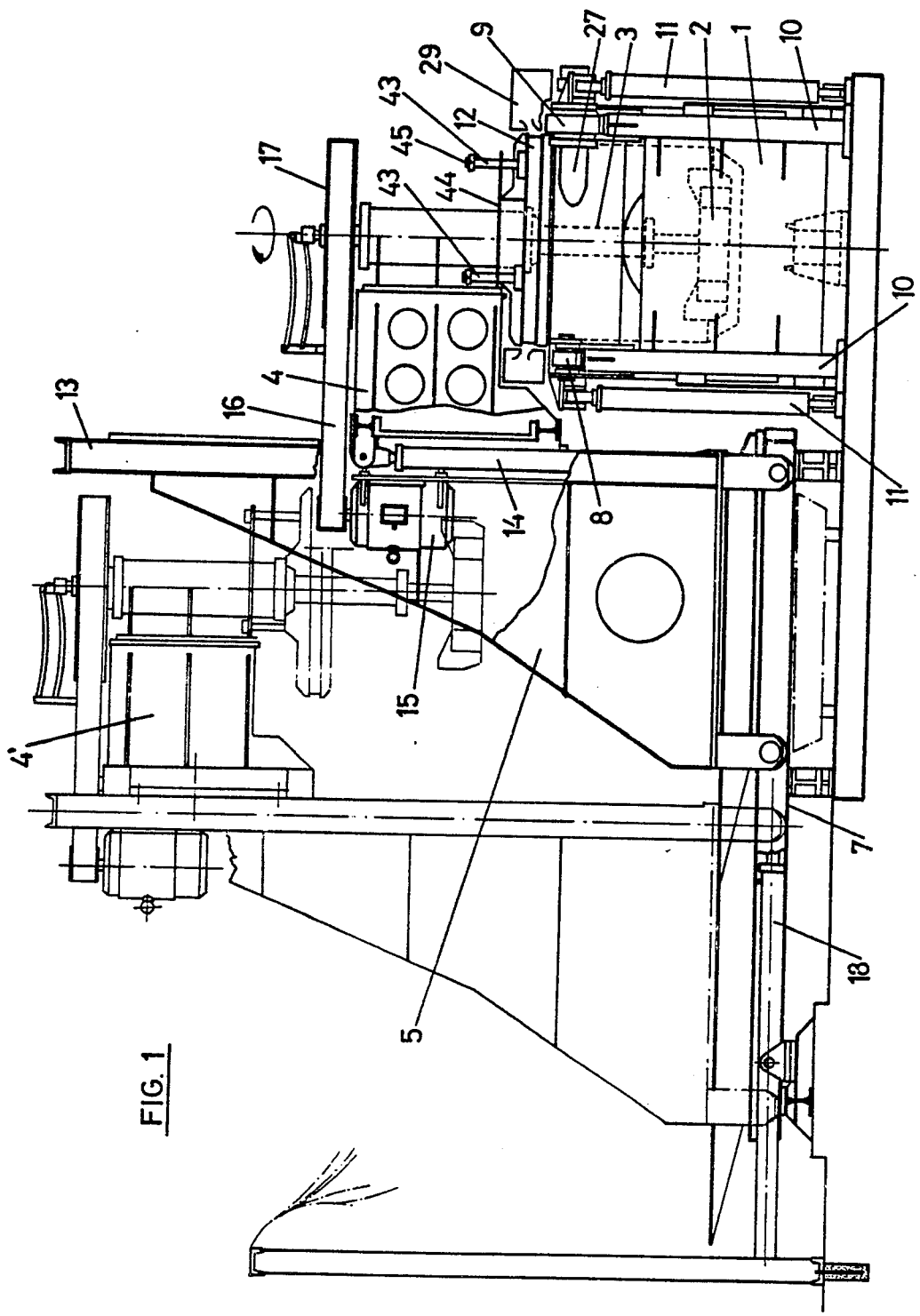
FIG. 1 is a front elevational view of a reaction installation constructed in accordance with the invention.

Referring to the drawings in particular, the invention embodied therein comprises a reaction installation for the recovery of zinc contained in a substance including scrap, residues and mattes of zinc.

Figure 2:
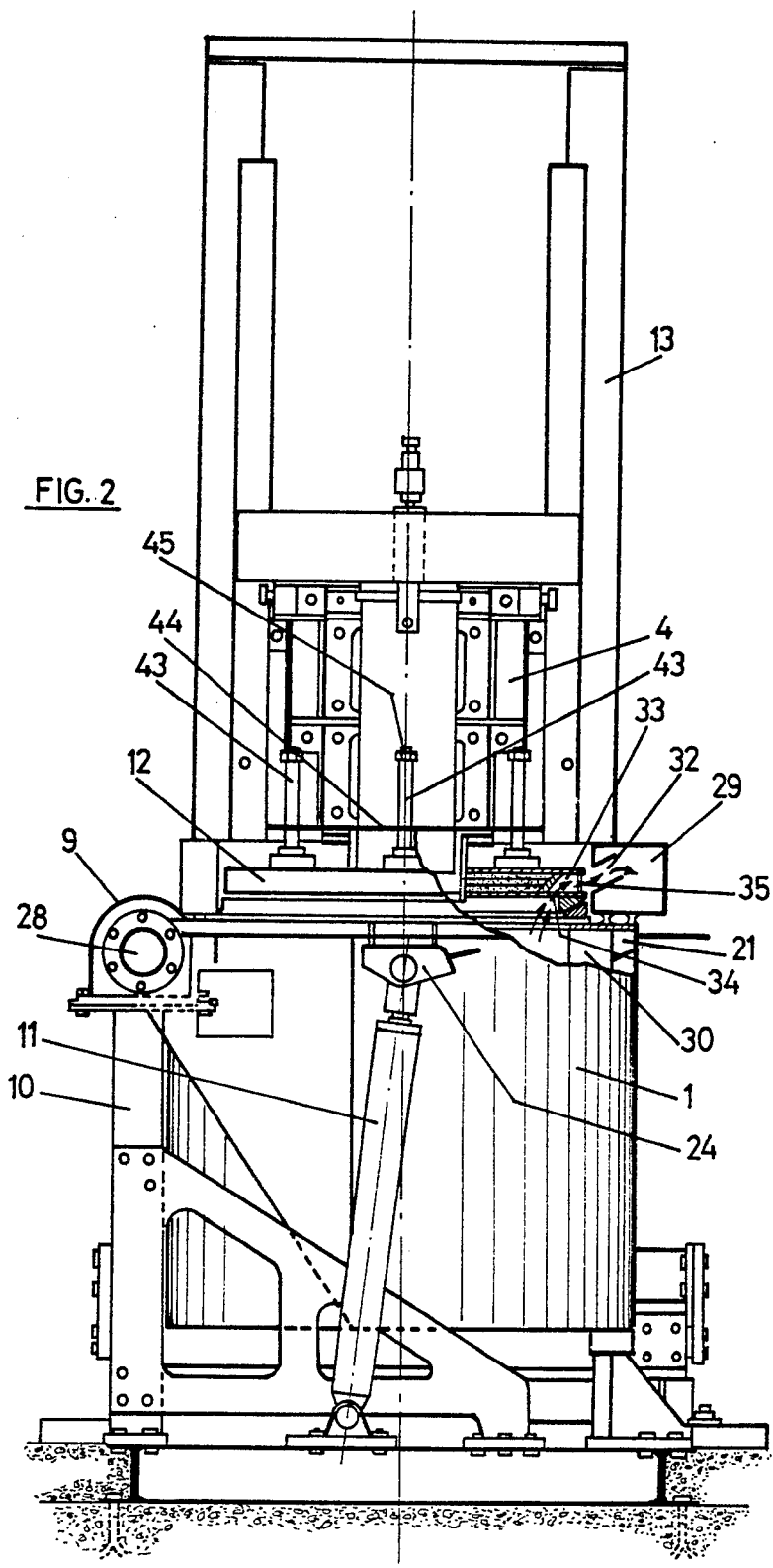
FIG. 2 is a side elevational view of the reaction installation shown in FIG. 1.
Figure 3:
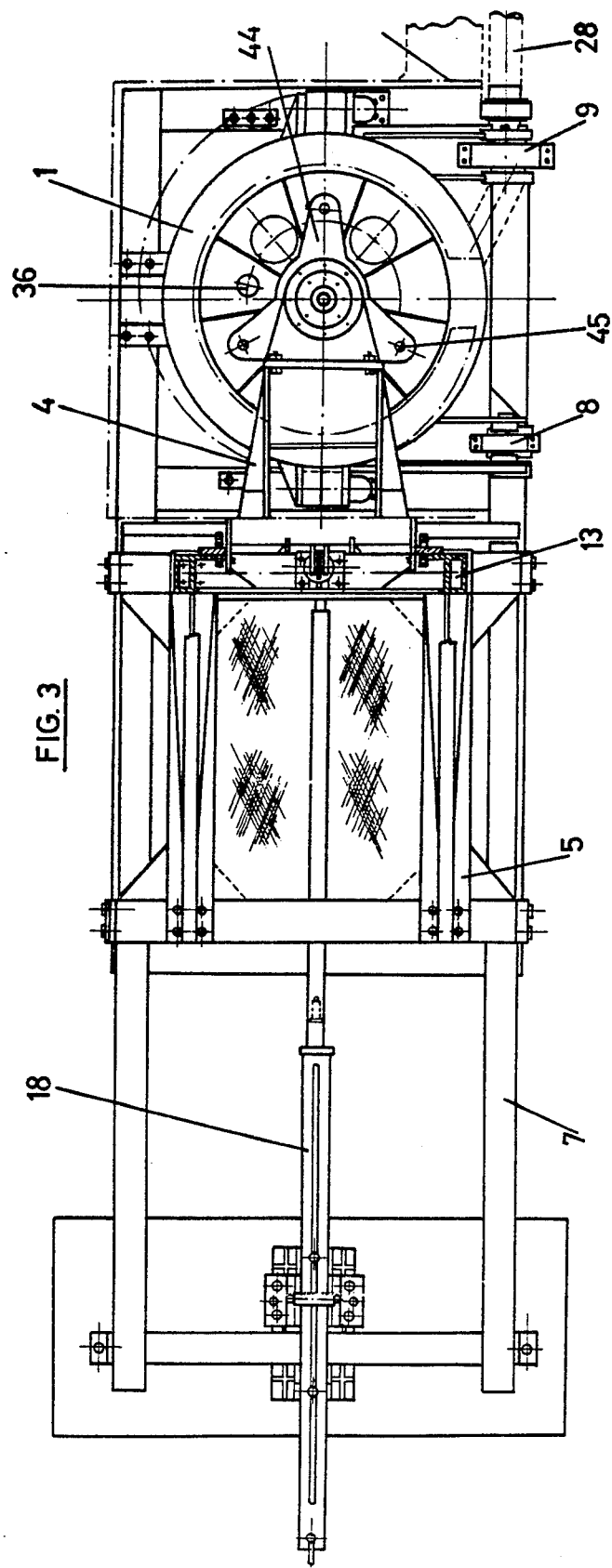
FIG. 3 is a plan view of the reaction installation shown in FIGS. 1 and 2.

As can be seen from FIGS. 1, 2 and 3, the reaction installation comprises a vat or tank indicated by reference numeral 1, in which there is housed a rotor 2 illustrated by broken lines in FIG. 1. The rotor 2 is mounted on a vertical rotary shaft 3 which is supported by the head member 4 which is displaceable in a vertical direction. In turn, the member 4 is mounted on a carriage 5 which is displaceable in a horizontal direction along the rail assembly 7.

The tank or vat 1 is intended to contain the residues or mattes, in a molten condition, and is mounted on two upper supports 8 and 9 which are supported by vertical columns 10. Two hydraulic cylinder units 11 are connected to the sides of the vat or tank 1, on the outside, whereby the tank or vat 1 can be turned over by rotating about the supports 8 and 9. The vat or tank 1 is closed upwardly by means of a cover 12 which is suspended from the member 4.

The member 4 is in turn mounted on vertical guides 13 along which it can be displaced by means of the hydraulic cylinder unit 14. The member 4 also carries the motor 15 which, by way of belts 16, actuates the pulley 17 to which the shaft 3 is fixedly connected.

The carriage 5 is displaced by means of the hydraulic cylinder unit 18.

As can be seen from FIG. 1, actuation of the hydraulic cylinder unit 14 can raise the member 4, by means of the vertical guides 13, while actuation of the hydraulic cylinder 18 can displace the carriage 5, on the rail assembly 7, to the position shown in broken lines in such a way that the member 4 takes up the position illustrated at 4', taking therewith the cover 12 and the paddle wheel rotor 2, after it has been removed from the vat or tank 1.

In that position, the vat or tank 1 is in a condition to receive the molten metal or to pour the contents thereof, by actuation of the hydraulic cylinder units 11.

As can be seen from FIGS. 1, 2 and 3, both the vat or tank 1 and the rail assembly 7 are mounted on a frame embedded in the foundations.

Figure 4:
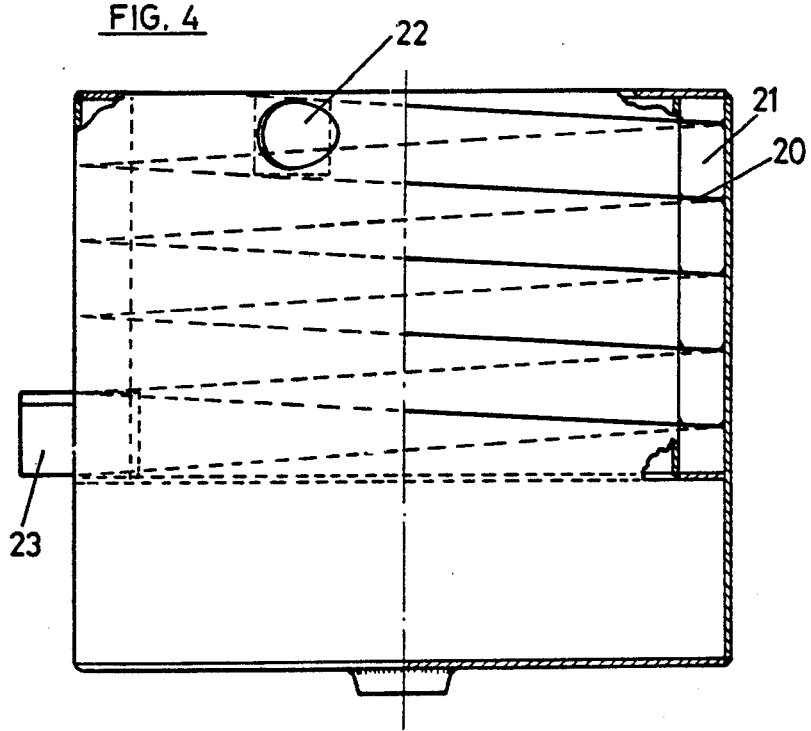
FIG. 4 is a diagrammatic view in partial section of the vat or tank or the reaction installation, showing the helical cooling conduit.
Figure 5:
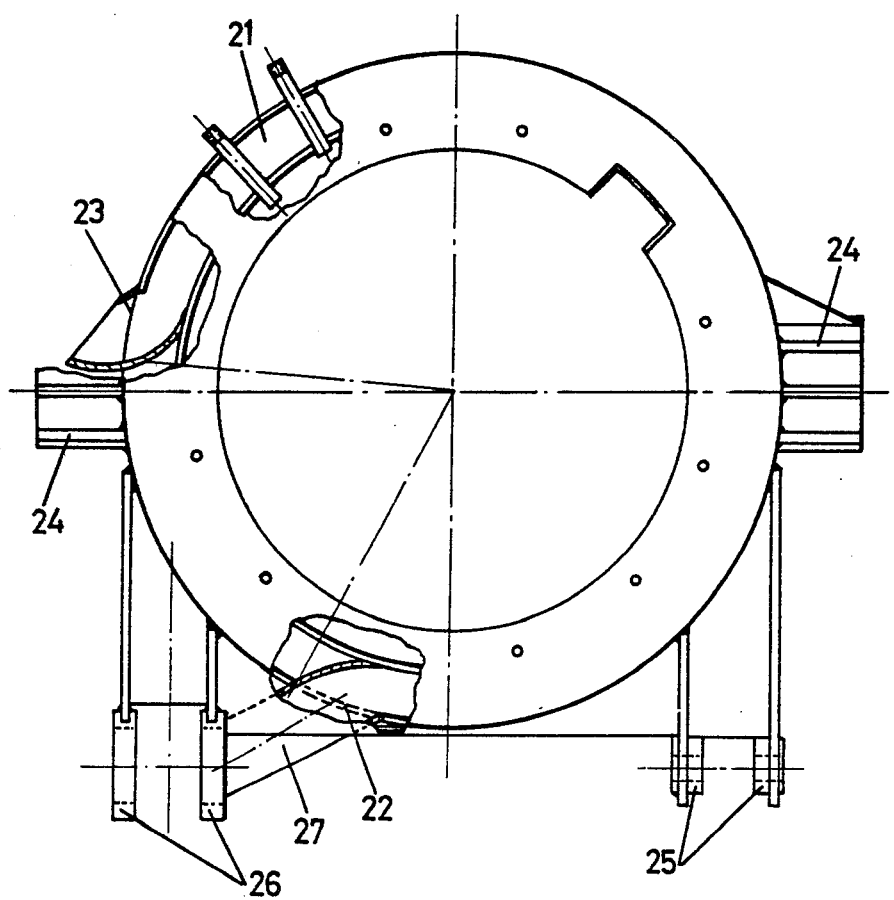
FIG. 5 is a top plan view of the vat or tank of the reaction installation.

As can be better seen from FIGS. 4 and 5, the vat or tank 1 is provided, in the wall thereof, around the refractory covering 30 shown in FIG. 2, with an annular chamber. A helicoidal partitioning wall 20 extends within the annular chamber, defining a helicoidal passage 21 which tangentially opens at its upper part, by way of the orifice 22, and in its lower part, by way of the aperture 23. On its outside, the vat or tank has upper, diametrally opposed lugs 24 (see FIG. 5) for connecting the hydraulic cylinder units 11. As can also be seen from FIG. 5, fixed to the vat or tank on the outside thereof are two pairs of rings 25 and 26 of different diameters. The upper orifice 22 of the helicoidal conduit is connected to the inner ring of the pair 26, by means of the duct portion 27. The supports 8 and 9 which are shown in FIGS. 1, 2 and 3 and which support the tank or vat 1 comprise respective plain or rolling bearings which are mounted between the pairs of rings 25 and 26. The rolling bearing mounted between the rings 26 carries a hollow shaft which extends the conduit means 27, with the outside ring 26 being connected to a conduit 28 (FIG. 3) for the supply of cooling air for the vat or tank, which will be discharged by way of the lower orifice 23.

Figure 6:
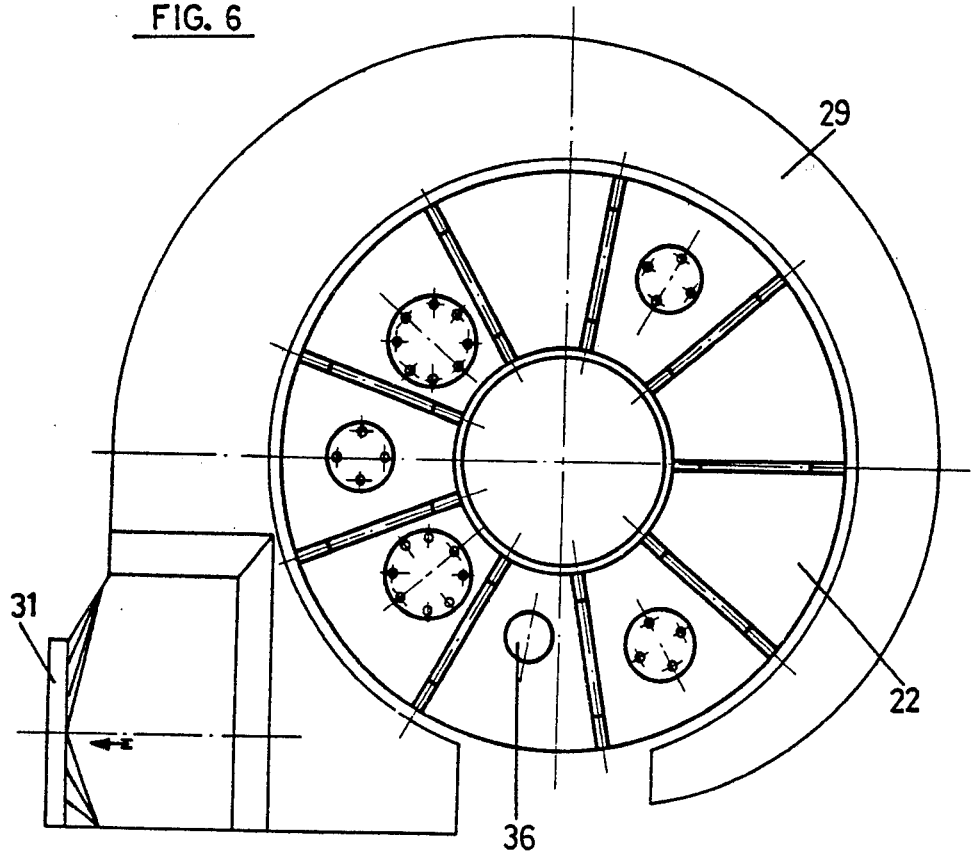
FIG. 6 is a top plan view of the cover of the reaction installation surrounded by the upper annular chamber.

As can be seen from FIGS. 1, 2 and 6, mounted on the vat or tank on the upper part thereof, around the cover 12, is an annular chamber 29 which is interrupted at a position opposite to the discharge orifice in the upper part of the vat or tank. The upper annular chamber, as can best be seen from FIG. 6, has an internal circular wall and an external helicoidal wall which progressively increases in section from one side of the discharge orifice to the other, where the annular chamber 29 has a discharge orifice 31 to which there is connected a suction conduit which takes the oxides that are removed to a bag filter (not shown).

As can best be seen from FIG. 2, the annular chamber 29 has a longitudinal groove 32 in its inside wall. The cover 12 has a peripheral chamber as at 33, provided in its bottom with apertures 34 which communicate with the interior of the vat or tank, while the peripheral wall thereof is also provided with apertures 35 disposed opposite the groove 32 of the chamber 29. In this way, the upper chamber 29 communicates with the interior of the vat or tank, by way of the cover 12. Both the cover and the wall of the vat or tank terminate in seating means which can be seen from FIG. 2, to provide perfect support for the cover 12 on the vat or tank.

As can be seen from FIG. 6, the cover 12 has an aperture 36 for the intake of air.

Figure 7:
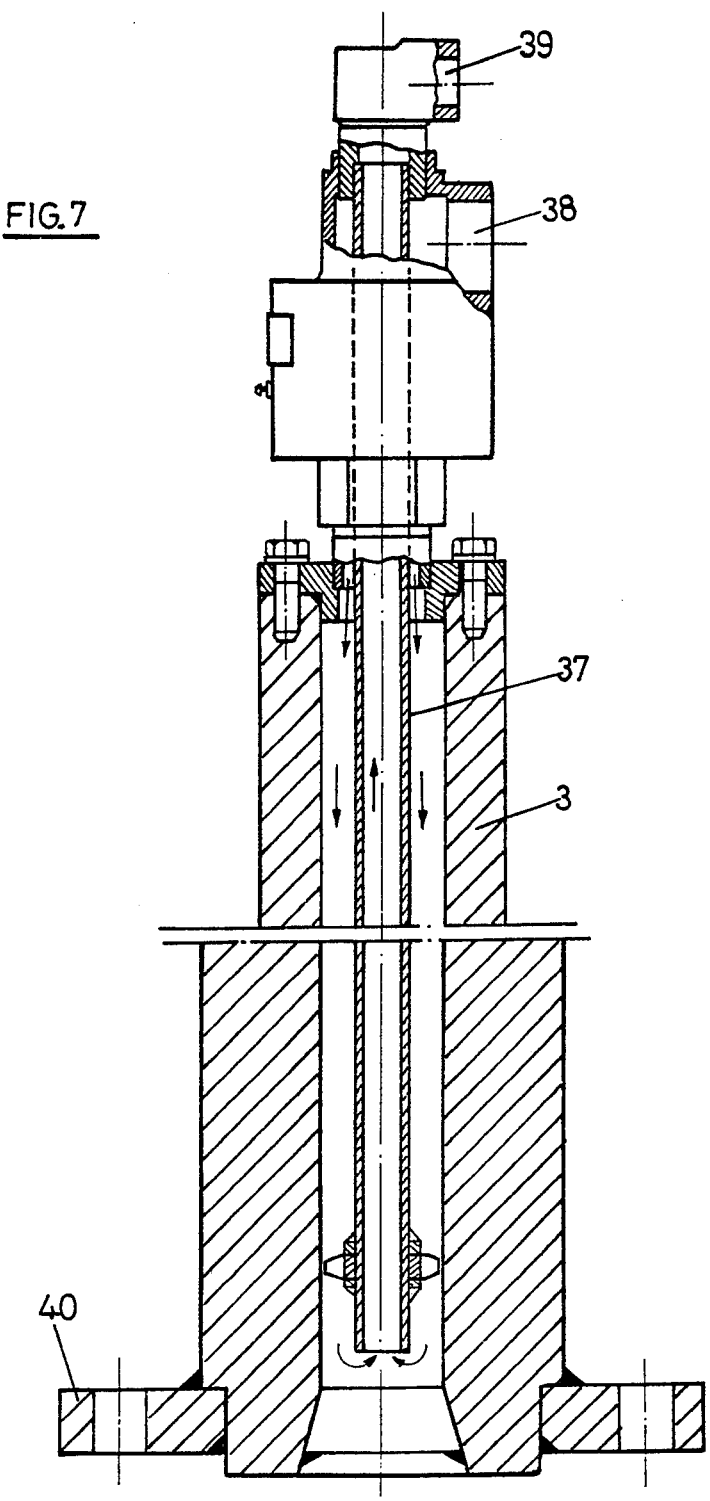
FIG. 7 is a view in vertical section of the rotor shaft.

Referring now to FIG. 7, the shaft 3 carrying the bladed wheel is of a tubular configuration, with a conduit 37 extending through the interior thereof. The conduit 37 extends as far as the vicinity of the lower end of the shaft. With the shaft 3, the conduit 37 defines an annular chamber which, in the same way as the conduit 37, is open at its upper end by way of orifices 38 and 39 for connection thereof to a cooling fluid supply circuit. At its lower end, the shaft 3 terminates with a flange 40 to which the paddle wheel shown in FIGS. 8 and 9 is secured. The paddle wheel comprises radial blades 41 which are coplanar with the axis of the shaft 3 and which carry vanes 42. With that construction, rotation of the wheel 2 generates, in the molten material, a radially directed flow which impinges against the walls of the vat or tank, thereby achieving a higher degree of efficiency in the separation process, due to the vortex produced which further promotes the oxidation of the crystals of the compound AlFe.

So that the agitator wheel can be positioned at different heights, to vary the vortex produced and therewith to facilitate separation and oxidation of the compound AlFe, as desired, the arrangement includes a system which, without the need to lift the cover, permits the agitation head member to be lifted to a given height, and therewith the agitator, from which the entire head member cover assembly rises.

For that purpose, mounted on the cover 12 are three guides or stems 43 which pass through apertures provided in the plate 44 which is fixed with respect to the agitation head member 4. The member 4 can be raised, thereby moving the agitator, without moving the cover, until the plate 44 comes into contact against the abutments 45. From that moment, the head member 4 will also move the cover 12 of the vat or tank.

The above described construction provides an improved system for cooling the vat or tank and a simple construction in respect of the circuit for the intake of air into the vat or tank to produce the oxidizing atmosphere required.

While a specific embodiment of the invention has been shown and described in detail to illustrate the application of the principles of the invention, it will be understood that the invention may be embodied otherwise without departing from such principles.

What is claimed is:

1. A reaction installation for the recovery of zinc contained in a stubstance including scrap, residues and mattes of zinc, comprising: a tank for containing the substance in a molten state; a paddle wheel mounted on a vertical shaft in said tank; an upper head member for supporting said shaft, which upper head member is displaceable in a vertical direction and which carries both drive means for driving said shaft and a closure cover for said tank; a horizontally displaceable carriage connected to said head member for supporting said head member; two external upper supports, connected to said tank and which define a rotary axis normal to an axis of said tank for permitting said tank to be moved and for supporting said tank; a sidewall of said tank including a peripheral chamber which surrounds an internal refractory coating of said side wall; means defining an upper annular chamber disposed around said cover for collected gases from said tank; said paddle wheel having blades which are co-planar with the axis of said tank so that they produce in the molten substance a flow in a radial direction, which impinges against the side wall of said tank; and a helicoidal transverse partitioning wall extending through the interior of said peripheral chamber and forming a helicoidal conduit which opens radially to the outside of said tank by way of an upper orifice and a lower orifice, which orifices are provided in an outside wall of said peripheral chamber for the flow of cooling air; said upper annular chamber communicating with the interior of said tank by way of said cover and having an external orifice for the discharge of gases from said annular chamber.

2. A reaction installation according to claim 1, wherein said upper annular chamber of said tank is interrupted in a region corresponding to said upper orifice, an internal wall of said annular chamber being of a circular configuration, with an intermediate continuous peripheral groove, an external wall of said annular chamber being of a spiral configuration, starting from one of the sides of a pouring channel for said tank, and having an aperture adjacent another side of said channel.

3. A reaction installation according to claim 1 wherein said cover of said tank is suspended from said head member by means of vertical guides which pass through apertures provided in a horizontal plate which is fixed with respect to said head member, said guides terminating in upper abutment means which is larger in size than said apertures, said guides being of sufficient height to permit said head member and paddle wheel to be partially raised without causing said cover to be raised, said cover having a second annular peripheral chamber which opens in its lower part by way of apertures disposed within region of seating on said tank and radially by way of apertures provided in the external wall of said annular chamber, which are disposed opposite the continuous peripheral groove of the internal wall of said upper annular chamber.

4. A reaction installation according to claim 1, wherein said external upper supports for said tank each comprise a shaft bearing member and a support having an annular configuration which defines a tubular member to which there is connected on one side thereof an air conduit and on another side thereof an additional conduit which is connected to one of said upper and lower orifices of said helicoidal conduit formed in said peripherial chamber.

5. A reaction installation according to claim 1, wherein said shaft of said paddle wheel is of a tubular configuration, a conduit extending through the interior thereof to the vicinity of said paddle wheel and defining, with a wall of said shaft, an annular chamber, said conduit and said annular chamber opening in their upper part for connection thereof to a cooling fluid supply circuit.

6. A reaction installation according to claim 1, including a trackway adjacent said tank, said carriage movably mounted on said track.

7. A reaction installation according to claim 1, wherein said drive means comprise a pulley connected to said shaft and a motor mounted on said head member engaged with said pulley for rotating said pulley.

* * * * *